(12) United States Patent
Gehrmann et al.

(10) Patent No.: US 11,263,394 B2
(45) Date of Patent: Mar. 1, 2022

(54) LOW-RESOURCE SENTENCE COMPRESSION SYSTEM

(71) Applicant: ADOBE INC., San Jose, CA (US)

(72) Inventors: Sebastian Gehrmann, Cambridge, MA (US); Franck Dernoncourt, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/530,875

(22) Filed: Aug. 2, 2019

(65) Prior Publication Data

US 2021/0034699 A1 Feb. 4, 2021

(51) Int. Cl.
*G06F 40/183* (2020.01)
*G06N 7/00* (2006.01)
*G06F 40/151* (2020.01)
*G06F 40/189* (2020.01)

(52) U.S. Cl.
CPC .......... *G06F 40/183* (2020.01); *G06F 40/151* (2020.01); *G06F 40/189* (2020.01); *G06N 7/005* (2013.01)

(58) Field of Classification Search
CPC .... G06F 40/183; G06F 40/189; G06F 40/151; G06N 7/005
USPC ........................................................ 715/234
See application file for complete search history.

(56) References Cited

U.S. PATENT DOCUMENTS

| | | | | |
|---|---|---|---|---|
| 5,907,836 A * | 5/1999 | Sumita | ................... | G06F 16/30 707/754 |
| 5,907,841 A * | 5/1999 | Sumita | ................... | G06F 16/345 |
| 6,317,708 B1 * | 11/2001 | Witbrock | ................ | G06F 40/35 704/9 |
| 6,766,287 B1 * | 7/2004 | Kupiec | ................ | G06F 40/253 704/9 |
| 7,167,825 B1 * | 1/2007 | Potter | ..................... | H04L 9/065 380/42 |
| 9,336,186 B1 * | 5/2016 | Filippova | .............. | G06F 40/151 |
| 9,767,193 B2 * | 9/2017 | Katae | ...................... | G06F 40/30 |
| 10,229,111 B1 * | 3/2019 | Filippova | ............... | G06F 40/30 |

(Continued)

OTHER PUBLICATIONS

Kamigaito et al.; Higher-order Syntactic Attention Network for Long Sentence Compression; Proceedings of NAACL-HLT 2018, pp. 1716-1726 New Orleans, Louisiana;, Jun. 1-6, 2018; pp. 1716-1726.*

(Continued)

*Primary Examiner* — Andrew R Dyer
(74) *Attorney, Agent, or Firm* — Shook, Hardy & Bacon L.L.P.

(57) ABSTRACT

Embodiments of the present invention provide systems, methods, and computer storage media for sentence compression in which a provided sentence is compressed to fit within an allotted space. Portions of the input sentence are copied to generate the compressed sentence. Upon receipt of a sentence, top candidate compressed sentences may be determined based on probabilities of segments of the input sentence to be included in a potential compressed sentence. The top candidate compressed sentences are re-ranked based on grammatical accuracy scores for each of the candidate compressed sentences using a language model trained using linguistic features of words and/or phrases. The highest scoring candidate compressed sentence may be presented to the user.

20 Claims, 6 Drawing Sheets

(56) References Cited

U.S. PATENT DOCUMENTS

| | | | | |
|---|---|---|---|---|
| 2002/0046018 | A1* | 4/2002 | Marcu | G06F 40/35 |
| | | | | 704/9 |
| 2005/0091203 | A1* | 4/2005 | Liu | G06F 16/345 |
| 2005/0210008 | A1* | 9/2005 | Tran | G06F 16/951 |
| 2007/0061356 | A1* | 3/2007 | Zhang | G06F 40/284 |
| 2007/0067294 | A1* | 3/2007 | Ward | G06F 16/9535 |
| 2010/0010803 | A1* | 1/2010 | Ishikawa | G06F 40/247 |
| | | | | 704/9 |
| 2012/0253792 | A1* | 10/2012 | Bespalov | G06F 16/353 |
| | | | | 704/9 |
| 2013/0173604 | A1* | 7/2013 | Li | G06F 16/3346 |
| | | | | 707/723 |
| 2014/0079297 | A1* | 3/2014 | Tadayon | G06K 9/00288 |
| | | | | 382/118 |
| 2015/0261745 | A1* | 9/2015 | Song | G06F 40/56 |
| | | | | 704/9 |
| 2017/0213130 | A1* | 7/2017 | Khatri | G06N 3/0445 |
| 2017/0228361 | A1* | 8/2017 | Zhang | G06F 16/337 |
| 2017/0235888 | A1* | 8/2017 | Rahman | G06F 40/295 |
| | | | | 705/3 |
| 2018/0260379 | A1* | 9/2018 | Yu | G06F 40/20 |
| 2018/0268307 | A1* | 9/2018 | Kobayashi | G06N 20/00 |
| 2019/0129947 | A1* | 5/2019 | Shin | G10L 25/30 |
| 2019/0197184 | A1* | 6/2019 | Srinivasan | G06F 40/205 |
| 2019/0228766 | A1* | 7/2019 | White | G06F 40/40 |
| 2019/0278843 | A1* | 9/2019 | Bao | G06F 40/30 |
| 2020/0110801 | A1* | 4/2020 | Zheng | G06N 3/0445 |

OTHER PUBLICATIONS

Ron Parr; Lecture 14: Hidden Markov Models; Oct. 16, 2003; Duke University; p. 14-1-14-8.*

11-711: Notes on Hidden Markov Model; Fall 2017; Carnegie Mellon University; 6 pages.*

Lebanon, Guy & Lafferty, John; Cranking: Combining Rankings Using Conditional Probability Models on Permutations; Conference: Machine Learning, Proceedings of the Nineteenth International Conference (ICML 2002), University of New South Wales, Sydney, Australia, Jul. 8-12, 2002; 8 Pages.*

Dooling, D. J. & Lachman, R. "Effects of comprehension on retention of prose". Journal of Experimental Psychology, 1971, vol. 88, No. 2, pp. 216-222.

Filippova, K. & Altun, Y. Overcoming the lack of parallel data in sentence compression. In Proceedings of the 2013 Conference on Empirical Methods in Natural Language Processing, 1481-1491 (2013).

Rush, A. M., Chopra, S. & Weston, J. A neural attention model for abstractive sentence summarization. In Proceedings of the 2015 Conference on Empirical Methods in Natural Language Processing, 379-389 (2015).

Sarawagi, S. & Cohen, W. W. Semi-markov conditional random fields for information extraction. In Advances in neural Information processing systems, 1185-1192 (2005).

Bahdanau, D., Cho, K., & Bengio, Y. (2014). Neural machine translation by jointly learning to align and translate. arXiv preprint arXiv:1409.0473. pp. 1-15.

Hochreiter, S., & Schmidhuber, J. (1997). Long short-term memory. Neural computation, 9(8): 1735-1780. pp. 1-32.

Lafferty, J., McCallum, A., & Pereira, F. C. (Jun. 8, 2001). Conditional random fields: Probabilistic models for segmenting and labeling sequence data pp. 3-10.

See, A., Liu, P. J., & Manning, C. D. (2017). Get to the point: Summarization with pointer-generator networks. arXiv preprint arXiv: 1704.04368. Cited document includes paper (pp. 1-11) and supplementary materials (pp. 12-20).

Sutskever, I, Vinyals, O., & Le, Q. V. (Decembers, 2014). Sequence to sequence learning with neural networks. Originally published in NIPS'14: Proceedings of the 27th International Conference on Neural Information Processing Systems—vol. 2 (pp. 3104-3112). Cited document includes pages numbered 1-9.

Vinyals, O., Fortunato, M., & Jaitly, N. (2015). Pointer networks. arXiv preprint arXiv: 1506.03134. pp. 1-9.

Wu, Y., Schuster, M., Chen, Z., Le, Q. V., Norouzi, M., Macherey, W., . . . & Dean, J. (Oct. 8, 2016). Google's neural machine translation system: Bridging the gap between human and machine translation. arXiv preprint arXiv:1609.08144. pp. 1-23.

Ye, Z. X., & Ling, Z. H. (May 10, 2018). Hybrid semi-markov crf for neural sequence labeling. arXiv preprint arXiv: 1805.03838. pp. 1-6.

* cited by examiner

LOW-RESOURCE SENTENCE COMPRESSION SYSTEM

BACKGROUND

With the proliferation in the number of channels on which content is consumed, presenting textual content for various purposes needs to cater to the requirements of chosen channels of content distribution. For example, while certain channels like computers, televisions, and laptops may allow for broader margins to fit text, other channels such as cellphones and tablets may require smaller margins. Specifically, titles and tutorial instructions can sometimes be too long to display on a screen. For example, at times, titles that are too long cannot be accommodated by the limited space a screen allots. Tutorial instructions can often be too long to fit within an allotted space on a mobile application. This also occurs when aiming to fit text into margins of documents, showing document previews in an overview, etc. Additionally, regardless of screen size, long sentences may sometimes be hard to understand, and users may have lower recall than with shorter sentences. Simply truncating long sentences, however, carries the danger of mischaracterizing context completely, or essentially generating gibberish.

Currently, sentence compression algorithms are typically utilized to compress text to fit within an allotted space. However, conventional sentence compression algorithms often require a large amount of data to train them to compress text in a meaningful and accurate way. The amount of data required to train the algorithm is often infeasible to collect in certain instances. Some conventional sentence compression systems require less structure and training data, but suffer from poor grammatical accuracy.

SUMMARY

Embodiments of the present invention are directed to a sentence compression system to efficiently and accurately compress sentences to fit within an allotted space. In this regard, a user may input a long sentence or a paragraph for compression. The long sentence may be segmented into a plurality of words and/or phrases. The sentence may be represented as a contextual representation of its words and/or phrases. Probabilities may be determined for each segment based on the likelihood of the segment being included in a potential compressed sentence. The segments may then be scored against each other based on the probabilities. A pre-defined number of candidate compressed sentences may be determined based on the scores and associated ranks for the candidate compressed sentences may be determined. The candidate compressed sentences may be re-ranked based on grammatical accuracy scores generated by a language model. The highest ranking candidate compressed sentence may be presented to the user in lieu of the long sentence. As such, a user can be efficiently and effectively provided with a compressed sentence within an allotted space without having to use computationally expensive compression systems that may not be available for use in a device with limited resources.

BRIEF DESCRIPTION OF THE DRAWINGS

The present invention is described in detail below with reference to the attached drawing figures, wherein.

DETAILED DESCRIPTION

Overview

Figure 1:
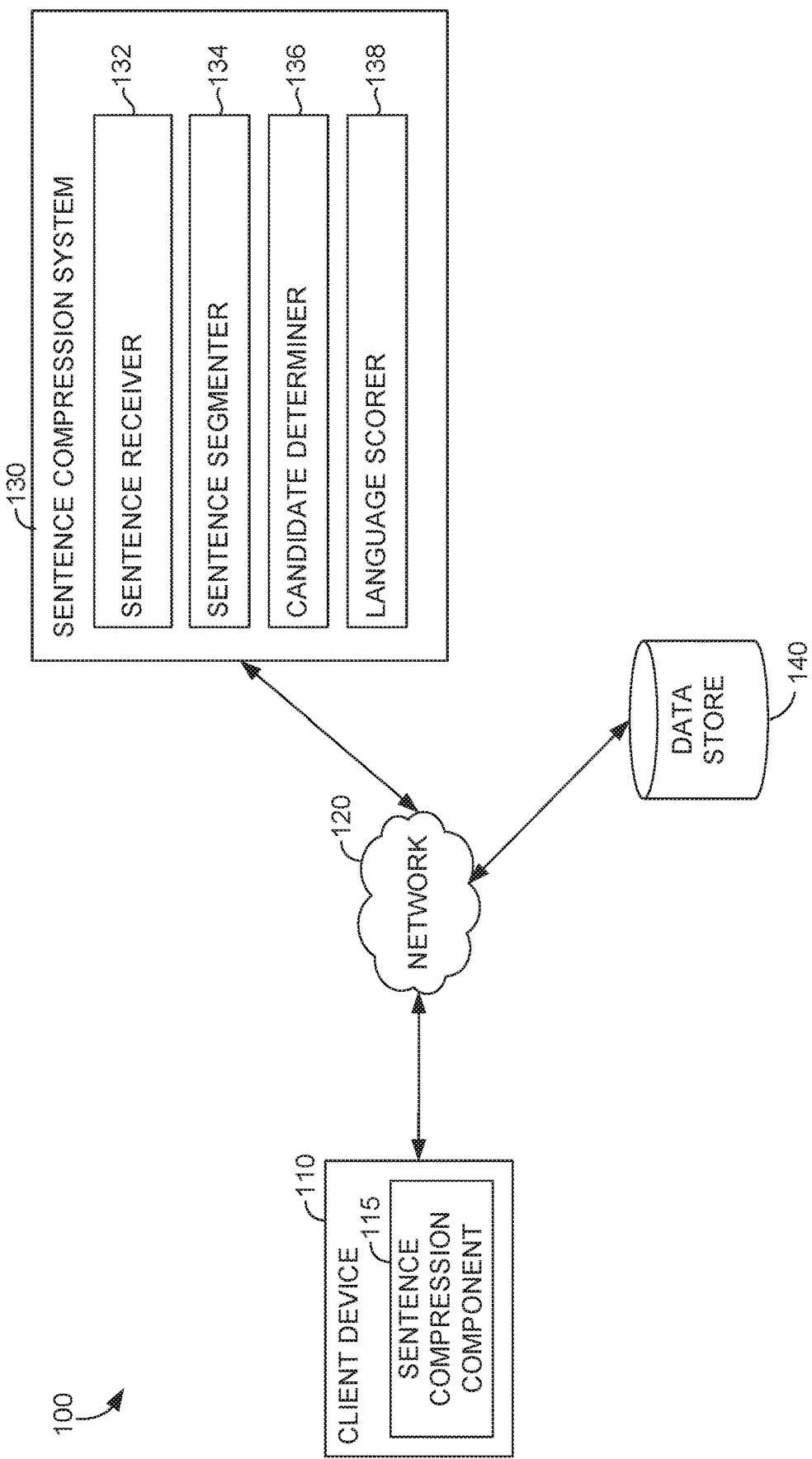
FIG. 1 is a block diagram of an exemplary environment suitable for use in implementing embodiments of the invention, in accordance with embodiments of the present invention.

Conventional sentence compression systems utilize a sequence-to-sequence model to compress sentences. These conventional systems generate a latent vector representation of each word in the sentence, and then use an autoregressive generation model to predict and generate one word at a time, often generating new words not in the original sentence. This allows for such conventional systems to condition the model based on all the previously generated words. The words predicted are then either regenerated, or new words are generated, to form a compressed/paraphrased sentence. However, due to the complexity of the models used by conventional compression systems, a large amount of training data is required to effectively train sequence-to-sequence models. Additionally, sequence-to-sequence models may be topic specific due to their dependency on a data set of known vocabulary. For example, a sequence-to-sequence model trained using judicial documents may not operate efficiently and accurately for compressing news articles. Some conventional compression systems add a copy mechanism to the sequence-to-sequence model. This allows the system to copy words from the sentence instead of generating new words. Because sequence-to-sequence models typically are topic specific and rely on data dependency, such systems are complex and computationally expensive.

Embodiments of the present invention address the technical problem of efficiently and accurately compressing sentences without requiring a large set of data to train the system and without the need for computationally intensive systems. In embodiments, a low-resource, structured, language-aware neural network based sentence compression system includes an algorithm that may be used to predict inclusion of words and/or phrases within a sentence that may be included in a compressed sentence derived from the sentence. The present system may be trained using a limited number of documents and/or sentences. In contrast to conventional systems that generate one word at a time conditioned on the input (e.g., long sentence), the present system predicts zeros and ones for each input word, requiring the system to not generate grammatical language without any prior knowledge of language or words. The present system thus allows for training an algorithm with fewer training sets, which in turn leads to the system requiring fewer resources to train, store and use in real-time.

The present system assumes certain properties of language. In embodiments, a subset of words in the input sentence are used in a resulting compressed sentence. It may be assumed that phrases are single units and should be analyzed together for inclusion in a compressed sentence. It may also be assumed that the words in a resulting compressed sentence are to be used in the same sequence as they appear in the input sentence. The phrases or words may be considered for inclusion in a compressed sentence in the order they appear in the sequence of words in the sentence. These assumptions inherent in the present system reduce the search space and resources required to perform compression. In contrast to the conventional systems, where one word from a vocabulary is chosen at a time, requiring an exponentially large search space, the present system requires a comparatively small search space and computing resources by simplifying the amount of training data set required to train the present algorithm, and reducing the number and order of segments to be considered for inclusion in a compressed sentence.

In some examples, a Semi-Markov Conditional Random Field ("SCRF") algorithm may be trained to determine scores for each word and/or phrase within a sentence. The scoring may be calculated as a probability of the word and/or phrase being included in a compressed sentence, marginalized over all possible words and/or phrases within the sentence. The SCRF algorithm provides the advantage of tracking and utilizing the latent meaning of previous words and/or phrases in a sentence to predict a subset of words to be included in the compressed sentence. This directional dependency allows for the use of context in predicting the next word to include in the resulting compressed sentence. The present systems allow for training a neural network to predict compressed sentences without requiring large training sets. This is possible due to the present system's ability to account for directional dependency and learning from not only individual words but also from phrases and overall sentences.

The present system may generate a pre-defined number of compressed sentences using the determined scores for the words and/or phrases. Each word and/or phrase may be represented in the SCRF as a tuple, i.e., an ordered list. The tuple may include start of the phrase, end of the phrase, and a corresponding label for the associated phrase. For each tuple, a probability of the phrase being included in a compressed sentence may be computed. The words and/or phrases may then be scored based on those probabilities as relative to all possible words and/or phrases in the sentence. In one example, a Viterbi algorithm may be modified to produce top candidate compressed sentences by relaxing a conventional Viterbi algorithm to determine top k candidate compressed sentences. A conventional Viterbi algorithm determines a best compressed sentence, with no inter-segment dependencies. The conventional Viterbi algorithm may be modified to yield a pre-defined number of top candidates based on the scores from the SCRF. This allows the system to retain the data-efficiency of the SCRF algorithm, as the present system learns from inter-dependency between words and phrases within sentences, without needing to learn meanings for an entire vocabulary.

The top candidate compressed sentences may be applied to a language model trained on compressed sentences which re-rank the top candidate compressed sentences based on grammatical accuracy associated with each of the candidates. The language model may generate grammatical accuracy scores based on likelihood of the compressed sentences being grammatical. These scores may then be used to re-rank the candidates. The language model may be trained using compressed sentences as ground truth data along with full-length sentences. In some examples, a language model may be normalized to prevent the model from preferring shorter compressions to longer compressions. A scoring function designed to attribute such length normalization may be used by the language model to re-score the top candidates using fixed parameters in the function to generate normalized scores for each candidate.

In one example, the candidate compressed sentence with the highest score generated by the language model may be presented as the selected compressed sentence. In another example, the scores from the language model may be combined with the scores from the SCRF to determine the selected compressed sentence for display. Further, a weighing parameter may be used to weight the language model scores when combined with the SCRP scores for the candidates. As such, the present system determines a selected compressed sentence based on both the importance of words and/or phrases and the overall grammatical accuracy of the compressed sentence.

In some embodiments of the present system, linguistic features may be used to further train a neural network to determine linguistic features of word and/or phrases. The neural network of the present disclosure may be trained using annotated compressed sentences. The compressed sentences may be annotated to tag linguistic features, such as but not limited to, parts-of-speech, syntax dependencies, shapes, named entities, etc. As such, during deployment, the present system may recognize linguistic features associated with words and/or phrases in input sentences. The linguistic features may further enable the present system to determine scores for the recognized words and/or phrases. The linguistic features enable the system to more accurately predict compressed sentences as compared to approaches using just words in a sentence to predict compressed sentences.

Aspects of the technology disclosed herein provide a number of advantages over previous solutions. For instance, one previous approach involves generating each predicted word or generating a new word when a word in the sentence is determined to be included in the compressed sentence. However, that approach requires training an algorithm with a large amount of data, making it computationally expensive, especially for deploying on a small device with limited resources, such as a mobile device. That prior approach is also constricted to a set vocabulary, resulting in an even higher resource requirement, and sometimes confining it to a specific topic.

To avoid such constraints on the present system, embodiments of the technology described herein, for instance, systematically develop an algorithm(s) to recognize linguistic features of a sentence, generate a compressed sentence with only the words found in the originating sentence, while preserving the grammatical accuracy of the compressed sentence. Unlike the conventional systems, the embodiments of the present technology only predicts yes or no (e.g., zero or one) for each word or phrase of the sentence considered, reducing the amount of computing resources required to predict a compressed sentence. Embodiments of the present technology may allow for sequential dependencies in predicting each next word for the compressed sentence. Additionally, embodiments of the present technology may train the algorithm with relatively limited amounts of data, and still efficiently generate compressed sentences with similar or higher accuracy than conventional systems that need to be trained with a large amount of data. This is possible by assuming that phrases are to be considered during compression as a unit and the words in the resulting compressed sentence are to be in the same linear order as they were found in the input sentence.

Having briefly described an overview of aspects of the present invention, various terms used throughout this description are provided. Although more details regarding various terms are provided throughout this description, general descriptions of some terms are included below to provider a clearer understanding of the ideas disclosed herein:

A long sentence generally refers to a natural language sentence and/or paragraph that may not fit into a desired space. A long sentence may be one or more sentences that may not fit into a desired space within which a sentence(s) is to be presented. A user may submit a long sentence in the form of a natural language phrase(s) through an application via a document.

A segment generally refers to a word and/or a phrase in a sentence (e.g., long sentence) in natural language form. A phrase may span three or more words in a sentence. A sentence may include one or more segments. Each segment may be represented as a tuple, including a starting index of the segment, an ending index of the segment, and a corresponding label for the segment.

A long segment generally refers to a phrase within a sentence with a number of words exceeding a pre-determined maximum threshold. In order to reduce false negatives, a long segment (i.e., a segment with a number of words exceeding a pre-determined maximum threshold) may not be considered when determining whether a segment should be included in a compressed sentence.

A compressed sentence generally refers to a compressed version of a sentence in response to a received long sentence in an application that may fit into a desired space. A compressed sentence may include a fewer number of words and/or phrases than its corresponding long sentence. A compressed sentence represents the sentence in a compressed form. A compressed sentence may include one or more of the segments included in the long sentence.

Sentence Compression Environment

Referring now to FIG. 1, a block diagram of exemplary environment 100 suitable for use in implementing embodiments of the invention is shown. Generally, environment 100 is suitable for facilitating sentence compression, and among other things, facilitates determining and displaying compressed sentences including a compressed version of a sentence in response to a received long sentence in an application.

Environment 100 includes a network 120, a client device 110, and a sentence compression system 130. In the embodiment illustrated in FIG. 1, client device 110 includes a sentence compression component 115. Generally, the sentence compression component 115 presents compressed sentences in response to receiving long sentences. Client device 110 can be any kind of computing device capable of facilitating presentation of compressed sentences. For example, in an embodiment, client device 110 can be a computing device such as computing device 1100, as described below with reference to FIG. 6. In embodiments, client device 110 can be a personal computer (PC), a laptop computer, a workstation, a mobile computing device, a PDA, a cell phone, or the like. The components of environment 100 may communicate with each other via network 120, which may include, without limitation, one or more local area networks (LANs) and/or wide area networks (WANs). Such networking environments are commonplace in offices, enterprise-wide computer networks, intranets, and the Internet.

In FIG. 1, client device 110 includes sentence compression component 115. The sentence compression component 115 may be incorporated, or integrated, into an application or an add-on or plug-in to an application. The application may generally be any application capable of facilitating a sentence compression, and may be a stand-alone application, a mobile application, a web application, or the like. In some implementations, the application comprises a web application, which can run in a web browser, and could be hosted at least partially server-side. In addition, or instead, the application can comprise a dedicated application. In some cases, the application can be integrated into the operating system (e.g., as a service). Although generally discussed herein as sentence compression component 115 being associated with an application, in some cases, sentence compression component 115, or a portion thereof, can be additionally or alternatively integrated into the operating system (e.g., as a service) or a server (e.g., a remote server).

The sentence compression component 115 of client device 110 may include a user interface or application allowing the user to submit a document and/or a sentence. Any suitable user interface and input component may be used, such as those described with respect to I/O components 620 of FIG. 6. Various number and/or types of sentences may be received for compression. For example, the sentence compression component 115 can accept a Word document, a PDF document, a text sentence, and the like. In some embodiments, the sentence compression component 115 may receive a textual document and use any known technique to parse it into individual sentences. In some other embodiments, the sentence compression component 115 may receive an advertisement to display within a webpage or an applications, such as Adobe Experience Manager®, and sentences within the advertisement may be recognized and parsed. In other embodiments, the sentence compression component 115 may receive visual textual tutorials for compression. Generally, the sentence compression component 115 is in communication with the sentence compression system 130 via network 120, and may send the sentence(s) from the client device 110 to the sentence compression system 130 for processing. Although the sentence(s) is described as being sent to the sentence compression system 130, this need not be the case, as any or all of the components of the sentence compression system 130 may be located on the client device 110 or elsewhere.

The data store 140 stores a plurality of sentences and corresponding compressed sentences. In some examples, data store 140 may include a repository of known vocabulary with linguistic tags (e.g., part-of-speech tags, syntactic dependency tags, shape tags, and named entity tags) derived from the sentences and their corresponding compressed sentences. The sentences and their corresponding compressed sentences may be saved in an index.

Generally, the forgoing process can facilitate generation of a compressed sentence in response to receiving a long sentence (e.g., a sentence that may not fit into a desired space) by using a low-resource neural network including an algorithm to predict inclusion of words and/or phrases within a sentence that may be included in a compressed sentence, and further refining the algorithm with a language model to account for grammatical accuracy of a resulting compressed sentence. By adopting such algorithms to produce compressed sentences, there is no need to train the present neural network with a large amount of training data.

The sentence compression system 130 is generally configured to receive a document and/or a sentence and determine a compressed sentence that best represents the sentence in a compressed form. The sentence compression system 130 may receive the sentence from the sentence compression component 115 of the client device 110. In some examples, the sentence compression system 130 may be a part of the sentence compression component 115. In other examples, the sentence compression component 130 may be located on a remote server, such that sentence compression component 115 may communicate with the sentence compression system 130 via network 120. In the embodiments illustrated in FIG. 1, the sentence compression system 130 includes a sentence receiver 132, a sentence segmenter 134, a candidate determiner 136, and a language scorer 138.

The sentence compression system 130 is generally configured to compress sentences. Specifically, the sentence compression system may score words and/or phrases within a sentence to determine what words and/or phrases may be included in a compressed sentence. System 130 determines and ranks a pre-defined number of candidate compressed sentences using one or more of the words and/or phrases based on the scores. The sentence compression system 130 may use grammatical accuracy of candidate compressed sentences to further re-rank the candidate compressed sentences to determine a selected compressed sentence to present to the client device 110.

The sentence receiver 132 may retrieve or obtain a sentence from the sentence compression component 115 of client device 110. Upon obtaining a sentence, the sentence may be represented as a sequence of words, x (e.g., $x_1 \ldots x_n$). In embodiments, a contextual representation, w, of the sequence of words may be determined using a bidirectional long short-term memory layer algorithm as follows:

$$w = biLSTM_{last}(x)$$

where w is the last hidden vector for the query and x is the sequence of words in the query. The vector represents the semantics and the syntax of the words in the sentence in a vector space. Punctuations may be separated from words within the sentence, and the representation of the sentence may be generated by recognizing spaces between the words.

Sentence segmenter 134 may generally be configured to divide or segment a sentence into a plurality of segments. Each segment may represent a word and/or a phrase. A phrase may span three or more words. The sentence segmenter 134 may segment the sentence into a segmentation of x in an index represented as follows:

$$s = \{s_1, s_2, \ldots, s_p\}$$

where s represents the segmentation of the sentence into p segments (e.g., words, phrases). Each segment, $s_i$ may be represented as a tuple($b_i$, $e_i$, $\tilde{y}_i$), where b and e denote the starting index and ending index of a segment, respectively, and $\tilde{y}$ denotes a corresponding label for the segment. It should be noted that when the segment is a single word, b and e may be the same index within the sentence. It may be assumed that a phrase is a single unit and must be selected together for consideration for inclusion in a compressed sentence. Considering phrases as a single unit allows for the system to perform efficiently without learning from a large set of data since less units may be considered for inclusion in a compressed sentence.

In some examples, restrictions may be applied in order to ensure validity of the representation of a segment, especially, a phrase. For example, a restriction may include setting $b_1=1$, $e=|x|$, $b_i=e_i+1$, and $b_i \le e_i$. In some examples, a maximum length for a segment (e.g., phrase) may be set in order to avoid generation of false long phrases and save unnecessary computational expense of considering long segments that are unlikely to be proper phrases. In this way, restrictions may be applied to both ensure validity of phrases considered for compressed sentences as well as saving additional computational expense by restricting consideration of phrases above a certain threshold (e.g., three, five words) while still considering phrases that may not be considered for inclusion by conventional sentence compression systems.

Candidate determiner 136 may generally be configured to determine candidate (e.g., potential) compressed sentences for the obtained sentence by determining a probability of each segment being included in a compressed sentence. Candidate determiner 136 may access the data store 140 to determine the probabilities, and use the probabilities to further determine top candidate compressed sentences (i.e., a threshold number of top compressed sentences, e.g., top five, top ten, etc.) that include, or may include, a meaningful compression of the sentence. Each segment may be considered in the order that it appears in the sequence of words of the sentence. Further, the candidate determiner 136 may determine scores for each candidate compressed sentence based on the determined probabilities. The candidate compressed sentences may then be ranked based on the scores. Candidate determiner 136 may determine top candidate compressed sentences based on the rankings. The candidate compressed sentences with the top rankings may be determined to be the top candidate compressed sentences by the candidate determiner 136 as described in more detailed below with respect to FIG. 2.

Language scorer component 138 may be generally configured to re-rank the top candidate compressed sentences based on grammatical accuracy of each of the top candidate compressed sentences. This may be done by applying the top candidate sentences to a language model trained to determine grammatical accuracy of sentences. In some examples, the language model may be trained on compressed sentences. The language scorer component 138 may be further configured to use length normalization in order to limit or prevent overly benefiting (i.e., preferring) shorter compressed sentences (e.g., compressed sentences with fewer words) when re-ranking the top candidate compressed sentences. The language scorer component 138 may be further configured to determine a best compressed sentence for display based on the re-ranking of the top candidate compressed sentences. The language component 138 may provide the best compressed sentence to the sentence compression component 115 for display on a user interface of the client device 110. Alternatively, in embodiments where the sentence compression system 130 is resident on client device 110, the sentence compression component 115 may generate the best compressed sentence for display. Further details on determining the selected candidate compressed sentence are described below with reference to FIG. 3.

As such, the language scorer 138 is configured to re-rank the top candidate compressed sentences based on language features (e.g., grammatical accuracy) to determine the compressed sentence to present to a user which is grammatically and substantively correct. The candidate retriever 136 ranks the top candidate sentences based on substance, while the language scorer 138 re-ranks the top candidate compressed sentences based on grammatical accuracy.

Figure 2:
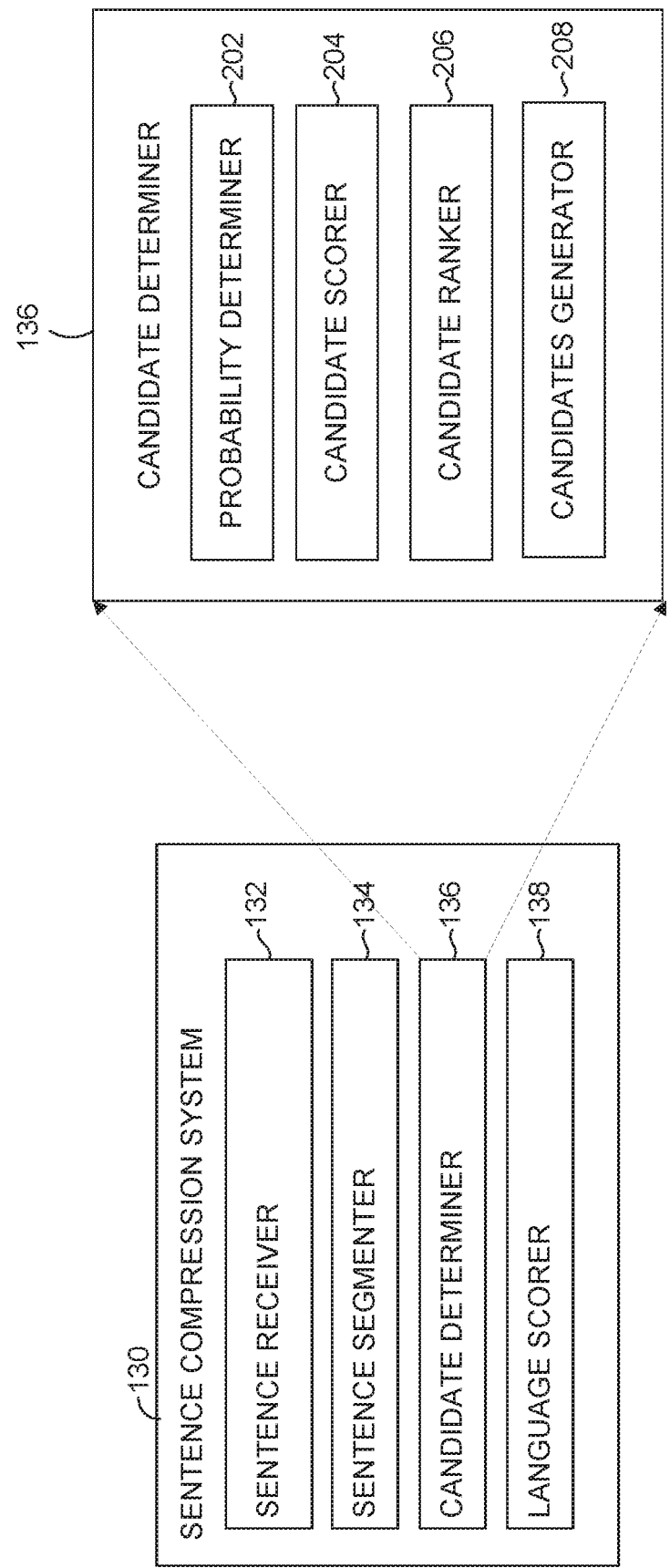
FIG. 2 illustrates an example candidate determiner of a sentence compression system, in accordance with embodiments of the present invention.

Turning to FIG. 2, FIG. 2 illustrates an exemplary candidate determiner 136 of a sentence compression system, in accordance with embodiments of the present invention. In some example embodiments, the candidate determiner 136 of FIG. 1 may include, as shown in FIG. 2, a probability determiner 202, a candidate scorer 204, a candidate ranker 206, and a candidate generator 208. It should be understood that the candidate determiner 136 may include one or more machine learning models to take as input a sentence and output top candidate compressed sentences. The machine learning model in embodiments may be trained using sentences as input and annotated compressed sentences as ground truth data. In some examples, the compressed sentences used for training may be annotated (e.g., using tags) with linguistic features, such as but not limited to, parts-of-speech, syntax dependencies, shapes, named entities, etc. As such, during deployment, the machine learning model may recognize linguistic features associated with words and/or phrases in input sentences. The linguistic features may be consumed by the learning model as additional information to determine grammatical accuracy of compressed sentences. The linguistic features may further enable the machine learning model to determine scores for the recognized words and/or phrases. The linguistic features enable the machine learning model to more accurately predict compressed sentences as compared to approaches using just words in a sentence to predict compressed sentences.

Although examples are described herein with respect to using deep neural networks (DNNs), and specifically long short-term memory (LSTM) neural networks, as the machine learning model, this is not intended to be limiting. For example, and without limitation, the machine learning model of the present disclosure may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvolutional, convolutional, generative adversarial, liquid state machine, etc.), computer vision algorithms, transformer architecture, and/or other types of machine learning models.

Probability determiner 202 may be configured to receive context segmentation representation from sentence segmenter 134. The probability determiner 202 may receive a segmentation (i.e., $s=\{s_1, s_2, \ldots, s_p\}$) of the sentence, x, where $s_i$ may be represented as a tuple $(b_i, e_i, \tilde{y}_i)$, where b and e denote the starting index and ending index of a segment, respectively, and $\tilde{y}$ denotes a corresponding prediction for the segment.

The probability determiner 202 according to embodiments may be further configured to determine probabilities of each possible segment of the sentence corresponding to a likelihood of the segment being included in a potential compressed sentence. The probability of a segmentation ŝ may computed as follows:

$$p(\hat{s}|w) = \frac{\text{score}(\hat{s}, w)}{\sum_{s'} \text{score}(s', w)}$$

where p(ŝ|w) is the probability of a segmentation marginalized over all possible segmentation of the conceptual representation, w, of the sentence. Specifically, the score of a tuple ŝ is divided by the score of all possible tuples at position s'. For example, for an input sentence, "the ball is round," there may be six possible tuples (i.e., segments) at position 2 (i.e., "ball") (i.e., "ball", "ball is", "ball is round", "is", "is round," and "round"). The score for a tuple that starts with ball and ends with round may be calculated by dividing the score for the particular segment "ball is round" by the addition of scores for all possible six tuples at the position "ball."

The probability determiner 202 may be further configured to determine a score for an individual segment. The segment probability score for each individual segment may be determined as follows:

$$\text{score}(s, w) = \prod_{i=1}^{|s|} \varphi(\tilde{y}_{i-1}, \tilde{y}_i, w, b_i, e_i)$$

where φ is a segment-level scoring function. As can be appreciated, the segment probability score is based on not only the segment under consideration, but also previous segments' prediction, $\tilde{y}_{i-1}$, and the conceptual representation, w, of the sentence. The segment probability score may be a score for all words within that particular segment. The segment-level scoring function φ may be defined as a product of a transition probability between the prediction for the current segment, $\tilde{y}_i$, and the prediction for the previous segment, $\tilde{y}_{i-1}$ and a segment-score $\Sigma_{k=b\_i}^{e\_i} W w_k'$, where W and $w_k'$ are parameters defined as concatenation of individual word, $w_k$, and the starting and ending words of the segment, $w_{b\_i}$-$w_{e\_i}$. The transition probability determines the likelihood of including a current segment when the probability for including the last segment in a potential compressed sentence was 0. This allows for the segment probability scores to be based on both the individual words in the segments and the overall segment itself. The segment-score $\Sigma_{k=b\_i}^{e\_i} W w_k'$ is an emission probability that determines a probability of including the current segment on its own accord, without considering previous segments' probabilities and/or scores. The product of the transition probability and emission probability may be used to determine the segment probability score. Note that W may be a trainable parameter of a neural network used by the probability determiner 202 to generate probabilities and corresponding segment probability scores for each of the segments of the sentence. The segment probability scores determine the likelihood of including the particular segment in a compressed sentence based on the segment itself and the decisions made for previous segments.

In some examples, a Semi-Markov Conditional Random Field (SCRF) algorithm may be used to determine the probabilities for segments. This may be achieved by loosening the conditions of a conditional random field algorithm to include local dependencies on a previous pre-defined number (e.g., k) of decisions made by the algorithm. As such, previous k segment probabilities may be relied upon to determine a probability for the current segment. Allowing for local directional dependencies enables the current system of the present disclosure to predict more accurate compressed sentences than conventional systems while using less computational power.

Candidate scorer 204 is configured to obtain and determine candidate compressed sentences based on the scores for the individual segments. The candidate scorer may obtain the segment tuples and their associated scores from the probability determiner 202. The candidate scorer 204 may determine candidate compressed sentences based on the scores of the individual segments. A pre-determined number (e.g., three, four, five) of top best candidate compressed sentences may be determined based on an argmax function. In some examples, a Viterbi algorithm may be used to generate a predetermined number of top candidate compressed sentences. For example, a best segmentation or compressed sentence may be determined using the Viterbi algorithm as follows:

$$s^* = \text{argmax}_{s \in S} p(s|w)$$

where s* is a best segmentation based on probabilities of each segment given a word representation. The Viterbi algorithm may be further relaxed to produce a pre-defined number of top candidate compressed sentences, $S_{top}$. The candidates with the highest possible scores out of all the possible segmentations may be determined. A best sequence of segments (i.e., words and/or phrases) based on the scores may be extracted. The scores for the candidate compressed sentences may be determined as a sum of the scores of the individual segments within the particular candidate compressed sentence.

Candidate ranker 206 is configured to rank the candidate compressed sentences and determine a pre-defined number of top candidate compressed sentences. The candidate ranker 206 may be configured to obtain scores for candidate compressed sentences from the candidate scorer 204. The candidate compressed sentences may be ranked based on their scores, with the highest scoring candidate compressed sentence being ranked the highest and so on. A pre-determined number of top candidate compressed sentences may be selected.

Candidate generator 208 is configured to generate the top candidate compressed sentences. The candidate generator 208 may obtain the top candidate compressed sentences with the associated ranks from candidate ranker 206. The top candidate compressed sentences obtained may include the tuple for each segment included in the particular candidate compressed sentence. Candidate generator 208 may be configured to copy the segments from the original sentence to generate the top candidate compressed sentences including actual words and/or phrases from the sentence.

Figure 3:
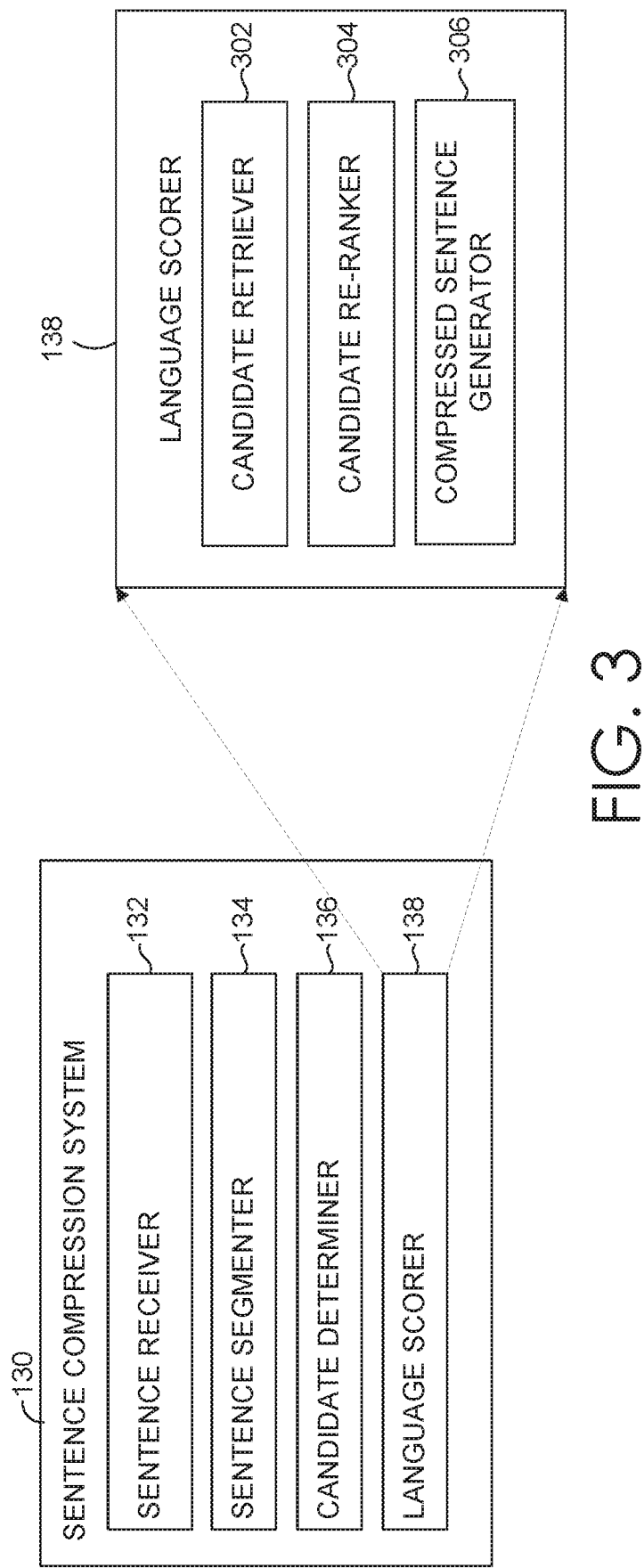
FIG. 3 illustrates an example language scorer of a sentence compression system, in accordance with embodiments of the present invention.

Referring now to FIG. 3, FIG. 3 illustrates an example language scorer 138 of a sentence compression system, in accordance with embodiments of the present invention. In some exemplary embodiments, the language scorer 138 of FIG. 1 may include a candidate retriever 302, a candidate re-ranker 304, and a compressed sentence generator 306. It should be understood that the language scorer 138 may include one or more machine learning models to take as input a sentence and output top candidate compressed sentences. The machine learning model of the present disclosure may be trained using compressed sentences as input and annotated compressed sentences annotated with linguistic features as ground truth data. The compressed sentences may be annotated to tag linguistic features, such as but not limited to, parts-of-speech, syntax dependencies, shapes, named entities, etc. As such, during deployment, the machine learning model may recognize linguistic features associated with words and/or phrases in input sentences. The linguistic features may further enable the present machine learning model to determine scores for the recognized words and/or phrases. The linguistic features enable the present model according to embodiments to more accurately predict compressed sentences as compared to approaches using just words in a sentence to predict compressed sentences.

Returning to FIG. 3, candidate retriever 302 may retrieve or obtain the top candidate compressed sentences with their associated ranks from the candidate retriever 136). Candidate retriever 302 may retrieve contextual word representations for the word and/or phrases included in the top candidate compressed sentences (e.g., from the sentence segmenter 134.

Candidate re-ranker 304 is configured to re-rank the top candidate compressed sentences based on their grammatical accuracy. The candidate re-ranker 304 may include a machine learning model to re-rank compressed sentences based on language dependencies. The machine learning model may be a language model trained using compressed sentences and a set vocabulary. In some examples, the compressed sentences during training may be augmented with linguistic tags associated with linguistic features for word and/or phrases in the compressed sentences. Candidate re-ranker 304 may employ length normalization to compensate for benefiting shorter compression over longer ones when determining the grammaticism of top compressed sentences. Any known language model may be used by the candidate re-ranker 304 to rank the top candidate compressed sentences based on language and grammatical accuracy. Generally, language models generate probabilities for each word in the sentence, and multiply the probabilities to determine an overall probability of a sentence being grammatically correct. As such, language models inherently prefer shorter sentences versus longer ones, because a product of more probabilities in a sentence results in a lower overall probability for longer sentences than it does for shorter sentences. In some examples, a language model based scoring function as follows may be used to determine the likelihood (e.g., probability) of a candidate compressed sentence being chosen as the best compressed sentence based on its language an grammatical accuracy with length normalization:

$$p_{LM}(s) = \frac{p(s) * 6^{\wedge}\alpha}{(5 + |s|)^{\wedge}\alpha}$$

where |s| is the length of the candidate compressed sentence, and p(s) is the probability of the selected sequence of word and/or phrases within the candidate compressed sentence being overall grammatically correct before length normalization. Note that α may be a trained parameter of the machine learning model. It should be understood that 6 and 5 thresholds in the above equation are for exemplary purposes only. Any such length normalization thresholds may be used based on the needs of the algorithm and the space within which a compressed sentence is to fit, providing the upper limit of the number of words to which the compressed sentence that the system should be able to compensate.

The candidate re-ranker 304 may rank the top candidate compressed sentences based on their probability scores determined according to their respective language and grammatical accuracy. The language model employed by the candidate re-ranker 304 may be trained on compressed sentences augmented with tags for linguistic features. Linguistic features used may include parts-of-speech, syntactic dependencies, shapes, named entity tags, etc. For example, part-of-speech tags may be used both in simplified and/or detailed forms to identify a type of word, such as a noun, verb, adverb, etc. Syntax dependency tags may be used to assess relationships between words. Shape tags may be used to include information about capitalization of letters and punctuations to determine start of sentences, etc. Named entity tags may used to identify entities that are the focus of a sentence. The present machine learning model may then learn more about language from the associated linguistic tags. As such, less data may be used to train the model but with more detailed annotations.

Additionally, the present machine learning model (i.e., language model) may be trained to predict next words and/or phrases within a candidate compressed sentence based on the previous words and/or phrases encountered. The word and/or phrase may be applied to a vector representation of a vocabulary of words already known by the machine learning model. The model may predict the next word based on the shortest distance of the conceptual word representation of the word being considered to the rest of the vocabulary. The probability attached to the predicted next word along with the probabilities associated with the previous words may be combined to determine an overall probability of grammatical accuracy of the candidate compressed sentence. The candidate re-ranker 304 may then re-rank the top candidate compressed sentences based on these grammatical probabilities for the candidate compressed sentences.

In some examples, the candidate re-ranker 304 may combine the scores for the top candidate compressed sentences from the language model and the candidate scorer 204 to re-rank the top candidate compressed sentences. The scores may be combined as follows:

$$s_{LM}^{*} = \mathrm{argmax}_{s \in S_{top}} p(s|x) + \lambda p_{LM}(s)$$

where λ is a weighing parameter that may be chosen to apply to the scores generated by the language model based on the weight to be given to those scores as compared to the scores generated by the candidate scorer 204. The combined score above may be used to re-rank the top candidate compressed sentences, with the candidate with the highest score being ranker first, and so on.

Compressed sentence generator 306 is configured to generate a better compressed sentence based on the re-ranking of the candidate compressed sentences. The compressed sentence generator 306 may obtain the re-ranked listing of the top candidate compressed sentences. The compressed sentence generator 306 may determine the highest ranked candidate compressed sentence as the better compressed sentence to present to a user via the client device 110. The compressed sentence generator 306 may obtain the tuples and positions for the segments in the better compressed sentence to present. The compressed sentence generator 306 may generate the better compressed sentence using the tuples and the original sentence or may cause generation of the better compressed sentence via the sentence compression component 115 of the client device 110. In some examples, the compressed sentence generator 306 may communicate the tuples for the better compressed sentence to present to the sentence compression component 115 via network 120. The sentence compression component 115 may then copy the words and/or phrases in the tuples from the original sentence to generate the better compressed sentence and present the better compressed sentence to the user via client device 110.

The sentence compression system of the present invention facilitates generation of a compressed sentence in response to receiving a long sentence (e.g., a sentence that may not fit into a desired space) by using a low-resource neural network including an algorithm to predict inclusion of words and/or phrases within a sentence that may be included in a compressed sentence, and further refining the algorithm with a language model to account for grammatical accuracy of a resulting compressed sentence. By adopting this system to produce compressed sentences, a neural network may be trained to generate compressed sentences with similar accuracy as conventional systems but with significantly less amount of training data than conventional systems. The present system may learn the meanings of words and/or phrases from limited training data and may also be deployed in devices with limited resources due to use of low level networks.

Exemplary Flow Diagrams

Figure 4:
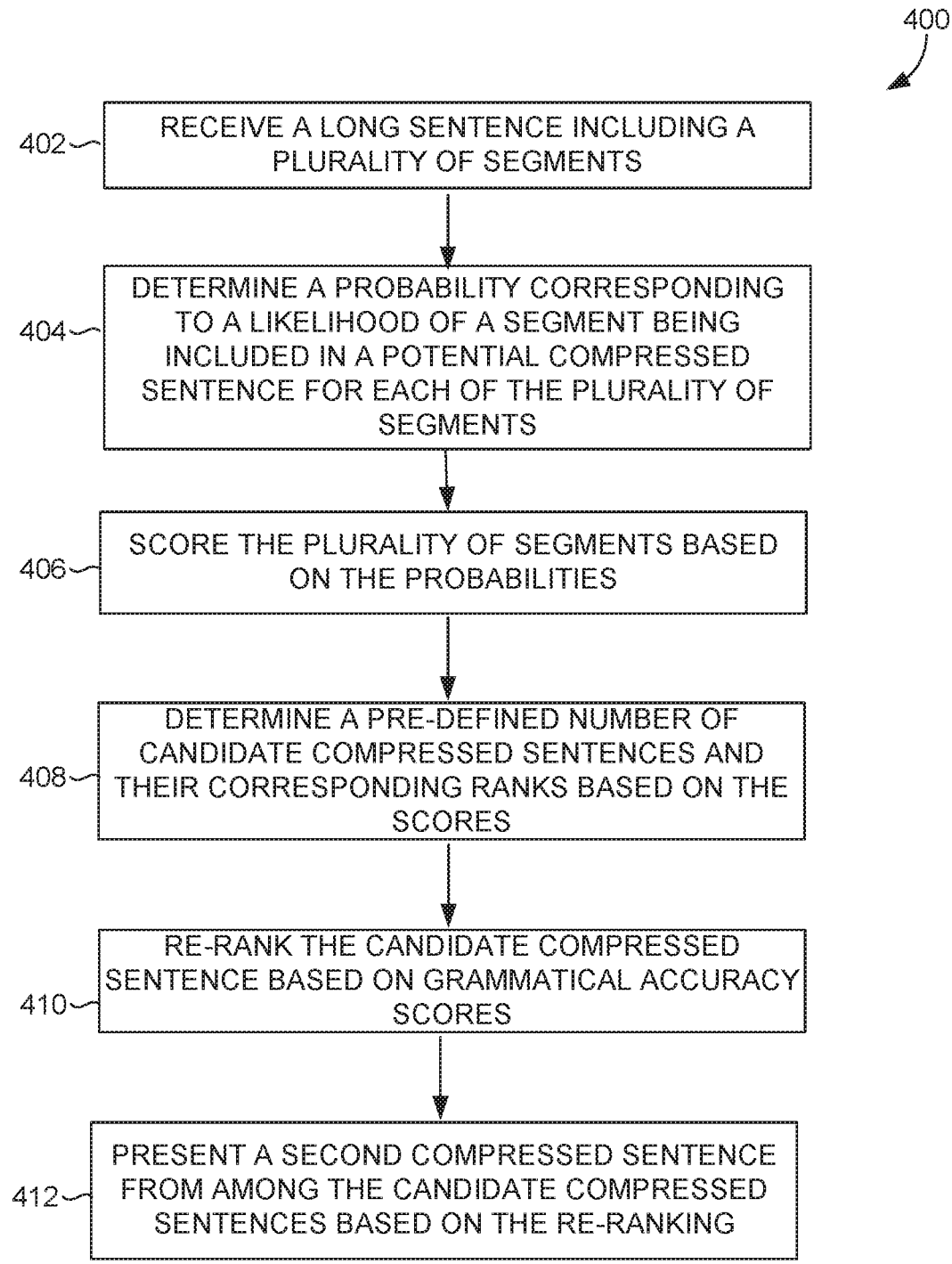
FIG. 4 is a flow diagram showing a method for generating a compressed sentence derived from a long sentence, in accordance with embodiments of the present invention.
Figure 5:
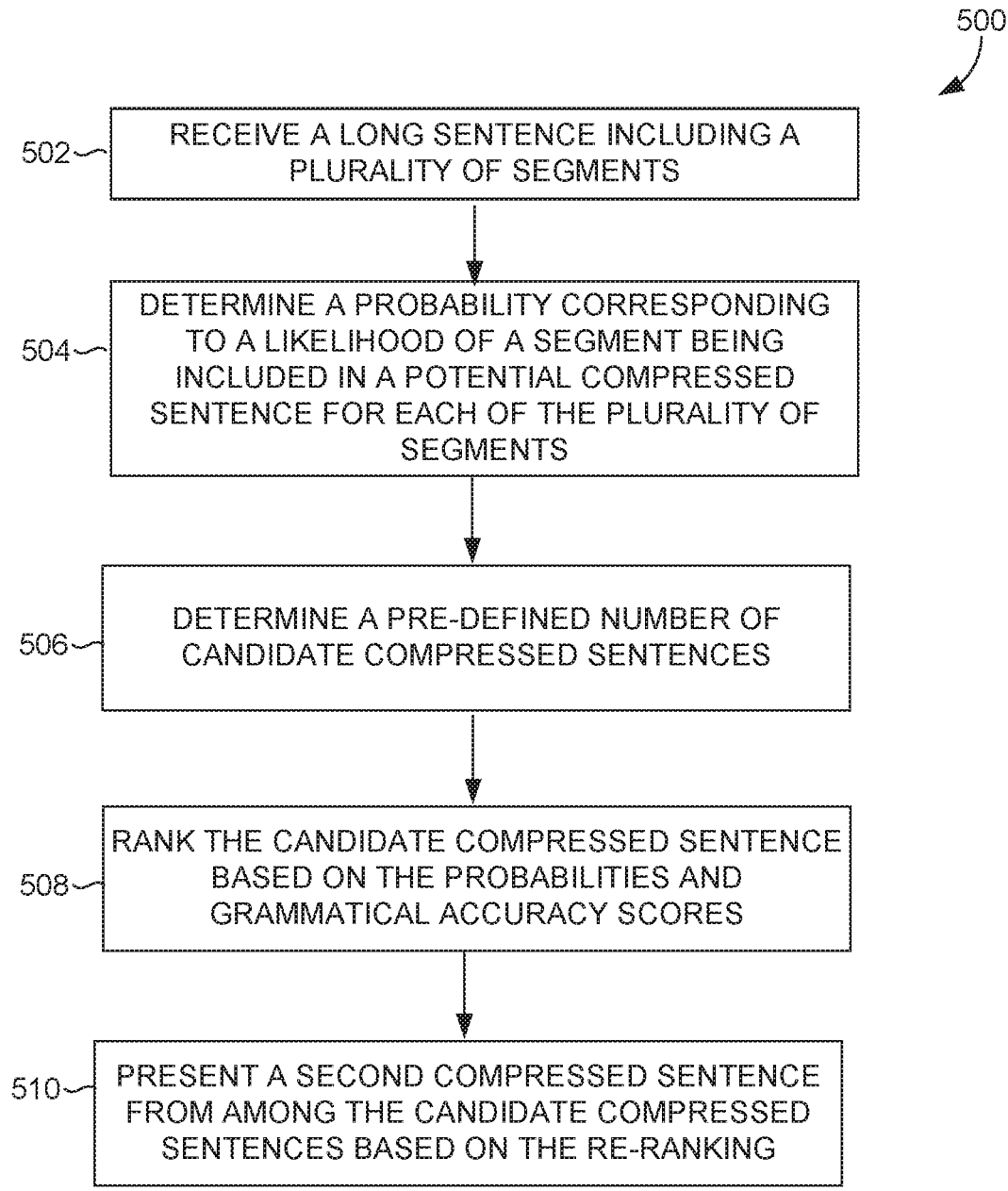
FIG. 5 is a flow diagram showing another method for generating a compressed sentence derived from a long sentence, in accordance with embodiments of the present invention.

With reference now to FIGS. 4-5, flow diagrams are provided illustrating methods for sentence compression according to the present disclosure. Each block of the methods 400 and 500 and any other methods described herein comprise a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

Turning initially to FIG. 4, FIG. 4 illustrates a method 400 for generating a compressed sentence derived from a long sentence, in accordance with embodiments described herein. Initially, at block 402, a long sentence including a plurality of segments is received. The long sentence may be received via a user interface of a device, such as client device 110 of FIG. 1, or a sentence receiver, such as sentence receiver 132 of FIG. 1. The plurality of segments may be words and/or phrases.

At block 404, a probability corresponding to a likelihood of a segment being included in a potential compressed sentence is determined for each of the plurality of segments. The probabilities may be determined by a probability determiner, such as the probability determiner 202 of FIG. 2. The probabilities may be based on the segment itself and the probabilities of previous segments.

Next, at block 406, the plurality of segments are scored based on the probabilities. A probability determiner, such as the probability determiner 202 of FIG. 2, may be used to generate scores for the plurality of segments based on the probability of the segment being included in a potential compressed sentence. The scores may take into account scores for previous segments considered.

At block 408, a pre-defined number of candidate compressed sentences and their corresponding ranks are determined based on the scores. A pre-defined (e.g., four, five) number of candidate compressed sentences and their corresponding ranks may be determined by a candidate ranker, such as candidate ranker 206 of FIG. 2 based on the scores of the segments. The candidate compressed sentences include a subset of the plurality of segments in the received long sentence.

Further, at block 410, the candidate compressed sentences are re-ranked based on a grammatical accuracy score for each of the candidate compressed sentences. A language model may be used to re-rank the candidate compressed sentences based on their corresponding grammatical accuracy scores as determiner by a candidate re-ranker, such as the candidate re-ranker 304.

At block 412, a selected compressed sentence from among the candidate compressed sentences based on the re-ranking is presented. The highest ranked candidate compressed sentence may be determined and selected by a compressed sentence generator, such as compressed sentence generator 306 of FIG. 3, and presented via a user interface of a client device, such as client device 110 of FIG. 1.

Now turning to FIG. 5, FIG. 5 illustrates a method 500 for generating a compressed sentence of a long sentence, in accordance with embodiments described herein. Initially, at block 502, a long sentence including a plurality of segments is received. The long sentence may be received via a user interface of a device, such as client device 110 of FIG. 1, or a sentence receiver, such as sentence receiver 132 of FIG. 1. The plurality of segments may be words and/or phrases.

At block 504, a probability corresponding to a likelihood of a segment being included in a potential compressed sentence is determined for each of the plurality of segments. The probabilities may be determined by a probability determiner, such as the probability determiner 202 of FIG. 2. The probabilities may be based on the segment itself and the probabilities of previous segments.

Next, at block 506, a pre-defined number of candidate compressed sentences are determined based on the probabilities. A pre-defined (e.g., four, five) number of candidate compressed sentences may be determined by a candidate ranker, such as candidate ranker 206 of FIG. 2 based on the scores of the segments. The candidate compressed sentences include a subset of the plurality of segments in the long sentence.

At block 508, the candidate compressed sentences are ranked based on the probabilities and a grammatical accuracy score for each of the candidate compressed sentences. A language model may be used to rank the candidate compressed sentences based on their corresponding grammatical accuracy scores as determined by a candidate re-ranker, such as the candidate re-ranker 304 of FIG. 3.

Finally, at block 510, a selected compressed sentence from among the candidate compressed sentences based on the re-ranking is presented. The highest ranked candidate compressed sentence may be determined and selected by a compressed sentence generator, such as compressed sentence generator 306 of FIG. 3, and presented via a user interface of a client device, such as client device 110 of FIG. 1.

Exemplary Operating Environment

Figure 6:
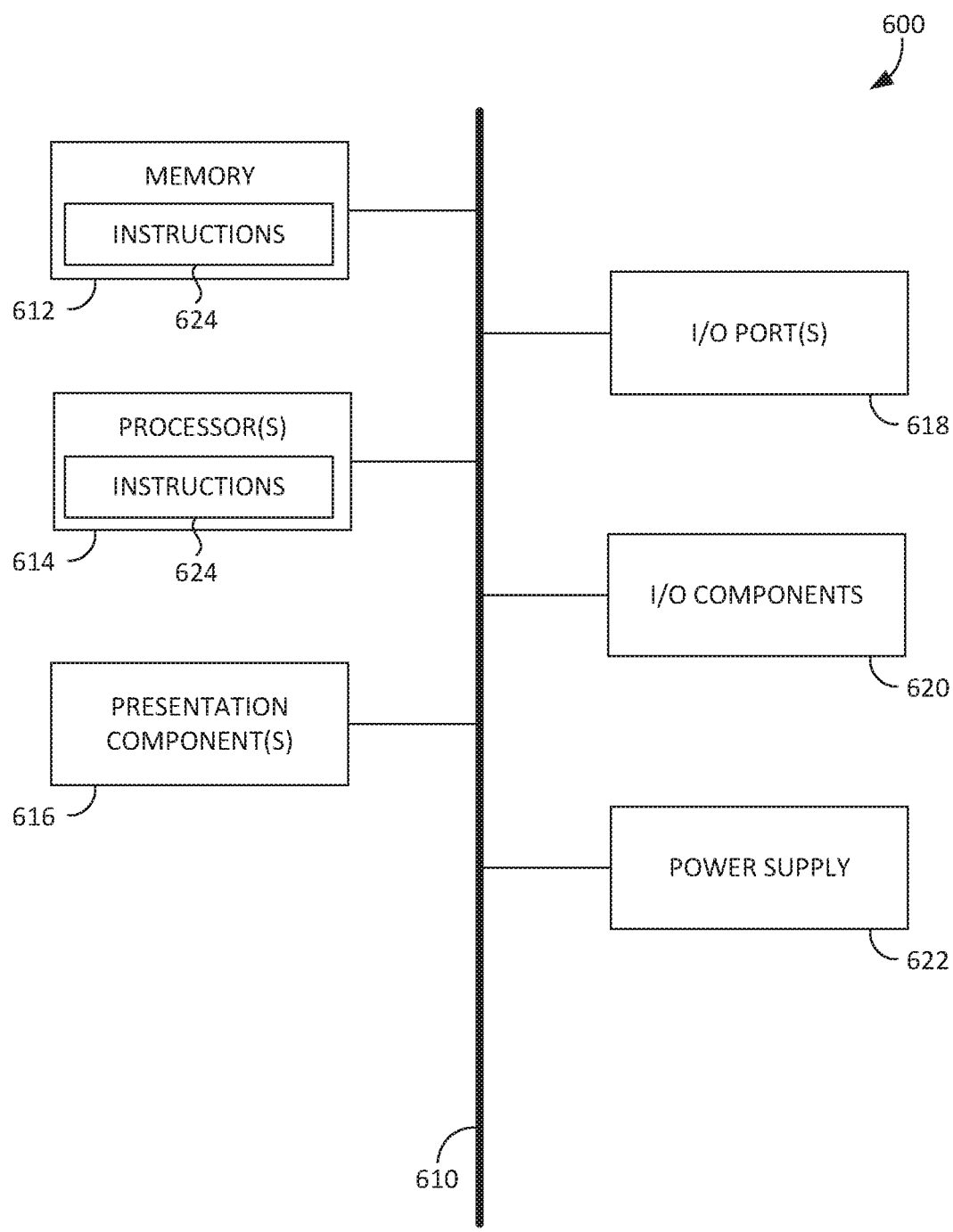
FIG. 6 is a block diagram of an exemplary computing environment suitable for use in implementing embodiments of the present invention.

Having described an overview of embodiments of the present invention, an exemplary operating environment in which embodiments of the present invention may be implemented is described below in order to provide a general context for various aspects of the present invention. Referring now to FIG. 6 in particular, an exemplary operating environment for implementing embodiments of the present invention is shown and designated generally as computing device 800. Computing device 600 is but one example of a suitable computing environment and is not intended to suggest any limitation as to the scope of use or functionality of the invention. Neither should computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a cellular telephone, personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes bus 610 that directly or indirectly couples the following devices: memory 612, one or more processors 614, one or more presentation components 616, input/output (I/O) ports 618, input/output components 620, and illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, touch pad, touch screen, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 600. Computing device 600 may be equipped with depth cameras, such as stereoscopic camera systems, infrared camera systems, RGB camera systems, touchscreen technology, and combinations of these, for gesture detection and recognition. Additionally, the computing device 600 may be equipped with accelerometers or gyroscopes that enable detection of motion. The output of the accelerometers or gyroscopes may be provided to the display of computing device 600 to render immersive augmented reality or virtual reality.

Embodiments described herein support sentence compression based on a user query. The components described herein refer to integrated components of an sentence compression system. The integrated components refer to the hardware architecture and software framework that support functionality using the sentence compression system. The hardware architecture refers to physical components and interrelationships thereof and the software framework refers to software providing functionality that can be implemented with hardware embodied on a device.

The end-to-end software-based sentence compression system can operate within the sentence compression system components to operate computer hardware to sentence compression system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the sentence compression system components can manage resources and provide services for the sentence compression system functionality. Any other variations and combinations thereof are contemplated with embodiments of the present invention.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether.

Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer method for generating a compressed sentence of a sentence, the method comprising:
   receiving a sentence, the sentence comprising a plurality of segments;
   determining a probability for each of the plurality of segments, each probability corresponding to a likelihood of the segment being included in a potential compressed sentence, wherein the probability is based on an emission probability score and a transition probability score associated with the segment, wherein the probability for each of the plurality of segments is marginalized over segments of the plurality of segments;
   scoring each of the plurality of segments based on the determined probabilities;
   determining a pre-defined number of candidate compressed sentences and their corresponding ranks based on the scores, each candidate compressed sentence including a subset of the plurality of segments;
   re-ranking the candidate compressed sentences based on a grammatical accuracy score for each of the candidate compressed sentences, wherein the grammatical accuracy score is based on a combination of probabilities that the subset of the plurality of segments is grammatically correct; and
   presenting, via a user interface, a selected compressed sentence from among the candidate compressed sentences based on the re-ranking, the compressed sentence being the candidate compressed sentence with a highest rank among the candidate compressed sentences.

2. The method of claim 1, wherein the probabilities are determined based at least in part on linguistic features associated with each of the plurality of segments, wherein the linguistic features include one or more of: parts-of-speech, syntactic dependency, shape, and named entity.

3. The method of claim 1, wherein the emission probability score indicates a probability of including the corresponding segment considered individually, and wherein the transition probability score indicates a likelihood of including the corresponding segment based on one or more previous segments of the plurality of segments being determined to have a zero probability of being included in the potential compressed sentence.

4. The method of claim 1, wherein determining the probability for each of the plurality of segments further comprises using a Semi-Markov Random Field algorithm.

5. The method of claim 1, wherein the grammatical accuracy score is further based on linguistic features of the subset of the plurality of segments included in the corresponding candidate sentence.

6. The method of claim 1, wherein the candidate compressed sentences are re-ranked using a language model.

7. The method of claim 6, wherein the language model is trained using training compressed sentences as ground truth, the training compressed sentences augmented with linguistic features, wherein the linguistic features include one or more of: part-of-speech tags, syntactic dependency tags, shape tags, and named entity tags.

8. The method of claim 1, the method further comprising:
dividing the sentence into the plurality of segments; and
scoring each of the plurality of segments based at least in part on scores for each previous segment of the plurality of segments.

9. The method of claim 8, wherein probabilities for each of the plurality of segments is determined based on a probability of the corresponding segment as compared to probabilities of all possible segments of the sentence.

10. The method of claim 1, wherein at least one segment of the plurality of segments is a phrase.

11. The method of claim 1, the method further comprising:
identifying an overall score for each of the candidate compressed sentences based on the corresponding scores of the subset of the plurality of segments included in the associated candidate compressed sentence; and
re-ranking the candidate compressed sentences based at least in part on a combination of the grammatical accuracy score and the overall score.

12. One or more computer storage media storing computer-useable instructions that, when used by one or more computing devices, cause the one or more computing devices to perform operations comprising:
receiving a sentence, the sentence comprising a plurality of segments;
determining, by a neural network, a probability for each of the plurality of segments, each probability corresponding to a likelihood of the segment being included in a potential compressed sentence, wherein the probability is based on an emission probability score and a transition probability score associated with the segment;
scoring, by the neural network, each of the plurality of segments based on the determined probabilities;
determining, by the neural network, a pre-defined number of candidate compressed sentences and their corresponding ranks based on the scores, each candidate compressed sentence including a subset of the plurality of segments;
re-ranking, using a language model, the candidate compressed sentences based on a grammatical accuracy score for each of the candidate compressed sentences, wherein the grammatical accuracy score is based on linguistic features of the subset of plurality of segments included in the corresponding candidate compressed sentence and a combination of probabilities that the subset of the plurality of segments is grammatically correct; and
presenting, via a user interface, a selected compressed sentence from among the candidate compressed sentences based on the re-ranking, the selected compressed sentence being the candidate compressed sentence with a highest rank among the candidate compressed sentences.

13. The media of claim 12, wherein the language model is normalized using a length nominalization function to adjust the grammatical accuracy score for the language model based on a length of the candidate compressed sentences.

14. The media of claim 12, wherein the language model is trained using a set of compressed sentences augmented with linguistic feature tags.

15. The media of claim 14, where the linguistic feature tags include one or more of: parts-of-speech tags, syntactic dependency tags, shape tags, and named entity tags.

16. The media of claim 12, wherein the operations further comprise:
identifying an overall score for each of the candidate compressed sentences based on the corresponding scores of the subset of the plurality of segments included in the associated candidate compressed sentence; and
re-ranking the candidate compressed sentences based at least in part on a combination of the grammatical accuracy score and the overall score.

17. The media of claim 12, wherein the operations further comprise:
segmenting the sentence into the plurality of segments; and
scoring each of the plurality of segments based at least in part on scores for each previous segment of the plurality of segments.

18. A sentence compression system comprising:
one or more hardware processors and memory configured to provide computer program instructions to the one or more hardware processors;
a sentence compression navigation environment configured to use the one or more hardware processors to:
receive a sentence, the sentence including a plurality of segments;
divide the sentence into the plurality of segments;
determine a probability for each of the plurality of segments, each probability corresponding to a likelihood of the segment being included in a potential compressed sentence, wherein the probability is based on an emission probability score and a transition probability score associated with the segment;
determine a pre-defined number of candidate compressed sentences based on the probabilities, each candidate compressed sentence including a subset of the plurality of segments;

determine a ranking for the candidate compressed sentences based on a grammatical accuracy score for each of the candidate compressed sentences, wherein the grammatical accuracy score is based on linguistic features of the subset of the plurality of segments included in the corresponding candidate sentence and a probability that, for a particular segment of the plurality of segments, a previous segment is grammatically accurate; and identify a selected compressed sentence for presentation from among the candidate compressed sentences based on the ranking, the selected compressed sentence being the candidate compressed sentence with a highest rank among the candidate compressed sentences.

19. The sentence compression system of claim 18, wherein the plurality of segments are restricted to include less than a pre-determined number of words.

20. The sentence compression system of claim 18, wherein probabilities for each of the plurality of segments is determined based on a probability of the corresponding segment as compared to probabilities of all possible segments of the sentence.

* * * * *